United States Patent [19]

Dahlback et al.

[11] Patent Number: 5,901,193
[45] Date of Patent: May 4, 1999

[54] NUCLEAR FUEL ELEMENT FOR PRESSURIZED-WATER REACTORS

[75] Inventors: Mats Dahlback; Peter Rudling, both of Vasteras, Sweden

[73] Assignee: ABB Atom AB, Vasteras, Sweden

[21] Appl. No.: 08/793,841

[22] PCT Filed: Sep. 7, 1995

[86] PCT No.: PCT/SE95/01003

§ 371 Date: May 13, 1997

§ 102(e) Date: May 13, 1997

[87] PCT Pub. No.: WO96/07764

PCT Pub. Date: Mar. 14, 1996

[30] Foreign Application Priority Data

Sep. 9, 1994 [SE] Sweden .................................. 9403004

[51] Int. Cl.$^6$ ........................................................ G21C 3/07
[52] U.S. Cl. ............................................................ 376/416
[58] Field of Search .................................... 376/414, 416, 376/417, 457; 420/422; 148/672, 421

[56] References Cited

U.S. PATENT DOCUMENTS

| 4,933,136 | 6/1990 | Foster et al. | 376/416 |
| 4,963,316 | 10/1990 | Stehle et al. | 376/416 |
| 5,023,048 | 6/1991 | Mardon et al. | 376/416 |
| 5,373,541 | 12/1994 | Mardon et al. | 376/416 |

FOREIGN PATENT DOCUMENTS

| 0 301 295 | 2/1989 | European Pat. Off. . |
| 0 380 381 | 8/1990 | European Pat. Off. . |
| 0 533 073 | 3/1993 | European Pat. Off. . |
| 0 522 098 | 7/1993 | European Pat. Off. . |
| WO 93/18520 | 9/1993 | WIPO . |

*Primary Examiner*—Daniel D. Wasil
*Attorney, Agent, or Firm*—Pollock, Vande Sande & Amernick

[57] ABSTRACT

The invention relates to a nuclear fuel element for pressurized-water reactors comprising a fuel cladding of a zirconium alloy composed of two parts. The inner part constitutes a supporting part of a conventional zirconium and the outer part a corrosion-resistant layer of zirconium with 0.65–0.95% Sn and 0.4–0.5% Fe. The difference in Sn content between the inner and outer parts must not exceed 0.7%. The cladding is finally heat-treated within the range 450 to 510° C.

3 Claims, No Drawings

NUCLEAR FUEL ELEMENT FOR PRESSURIZED-WATER REACTORS

TECHNICAL FIELD

The invention relates to the field of nuclear fuel for pressurized-water reactors, wherein the nuclear fuel comprises cladding tubes built up of two layers, an inner supporting layer of a conventional zirconium alloy and an outer layer of a zirconium alloy with improved corrosion properties.

BACKGROUND OF THE INVENTION

It is known that a nuclear fuel for pressurized-water reactors may comprise cladding tubes built up of two layers. EP 301 295 describes nuclear fuel elements with cladding tubes with an inner supporting part of zirconium with 1.2 to 2% Sn, 0.07 to 0.2% Fe, 0.05 to 0.15% Cr, 0.03 to 0.08% Ni and 0.07 to 0.15% O or zirconium with 1.2 to 2.0% Sn, 0.18 to 0.24% Fe, 0.07 to 0.13% Cr and 0.10 to 0.16% O. The outer layer shall be of a zirconium alloy with better corrosion resistance than the inner part of the tube and is described to comprise either one or more of the alloying additives Sn, Fe, Cr, or Ni in a total amount being less than 1%, or one or more of the alloying additives Sn, Fe, Cr or Ni in a total amount less than 1% and 0.2 to 3% Nb. The described examples of outer layers with the above composition and improved corrosion properties are zirconium with 2.5 Nb and zirconium with 0.25% Sn, 0.5% Fe and 0.05% Cr.

A problem which arises with a cladding according to EP 301 295 is due to the great difference in Sn content which exists between the inner part, which has 1.2 to 2% Sn, and the outer layer with 0.25% Sn. Since the Sn content influences the recrystallization temperature of the zirconium alloy, the cladding will after the final heat treatment, which for pressurized-water fuel usually is a stress-relieve anneal, have an inner part which is stress-relieve-annealed and an outer part which is recrystallization-annealed. Such a difference in state between the inner part and the outer layer leads to different hydride orientation in these parts and to accumulation of hydrides at the boundary layer between the parts. Hydrides in the cladding material occur due to hydrogen developed during the corrosion of zirconium during reactor operation being taken up to a certain part by the cladding material, and since zirconium has low solubility of hydrogen, the absorbed hydrogen will be precipitated in the form of zirconium hydrides. These are elongated in shape and very brittle.

During the manufacture of cladding tubes for nuclear fuel elements, it is therefore important to see to it that hydrides which are precipitated in the cladding material are evenly spread in the material and tangentially distributed in the cross section. The hydrides are very brittle and may act as indications of fracture. It is therefore important that the hydrides are precipitated tangentially in the cross section of the tube and that there are very few radially directed hydrides which may act as indications of a crack through the cladding wall.

Nuclear fuel with a cladding consisting of two layers is also known from WO 93/18520. This describes a two-layer cladding, where both layers contain the same alloying elements to facilitate the handling of material returned from the manufacturing process, and whereof these are at least Sn, Fe and Cr. The supporting inner layer comprises 1–2% Sn, 0.05–0.25% Fe, 0.05–0.2% Cr to the outer layer 0.5–1.3% Sn, 0.15–0.5% Fe and 0.05–0.4% Cr and to obtain improved workability and bonding between the layers during the manufacturing of the cladding, the ratio between the contents of Sn in the outer layer and the inner layer shall be within the interval 0.35 to 0.7 and the content of Sn in the inner layer shall be two to five times the content of Fe and Cr in the outer layer.

The problem with this kind of nuclear fuel is that also for these layers, there may be great differences in the Sn content between the outer and inner layers. The outer layer in WO 93/18520 is stated to contain, besides Sn, Fe and Cr and then preferably 0.28±0.04% Fe and 0.17±0.03% Cr in order not to obtain an alloy which is difficult to work. An example given is zirconium with 1.1% Sn, 0.4% Fe and 0.25% Cr.

Other known fuel elements with a two-layer cladding are described in EP 212 351 which shows an outer layer consisting of zirconium with additives of Fe, V, Pt or Cu. EP 380 381 describes outer layers of zirconium with 0.35 to 0.65% Sn, 0.2 to 0.65% Fe, 0.24 to 0.35% Nb.

DESCRIPTION OF THE PRESENT INVENTION

The invention is based on the realization that a fuel element with a two-layer cladding, in order to obtain a small amount of precipitated hydrides in the boundary zone between the layers and a tangential hydride distribution in both the inner and outer parts, shall be composed of zirconium alloys whose Sn content does not differ more than 0.7%. Since the cladding is built up in such a way that the difference in Sn content between the inner and outer parts does not exceed 0.7%, both parts have a relatively similar recrystallization temperature. This means that a finishing stress-relieve anneal of the cladding results in the outer layer being stress-relieve-annealed or only partially recrystallized. Sn and O increase the recrystallization temperature at a given degree of processing, whereas other alloying elements such as Fe, Cr, Ni and Nb reduce the recrystallization annealing temperature.

By a two-layer cladding, good corrosion properties may be utilized in an alloy for the outer layer together with good mechanical and creep properties of a conventional construction material for a fuel cladding such as Zircaloy-2 and Zircaloy-4, which constitute the inner supporting part. Zircaloy-2 contains 1.2–1.7% Sn, 0.07–0.2% Fe, 0.05–0.15% Cr, 0.03–0.08% Ni, 0.07–0.15% O and the total amount of Fe, Cr and Ni is within the interval 0.18–0.38%. zircaloy-4 contains 1.2–1.7% Sn, 0.18–0.24% Fe, 0.07–0.13% Cr and 0.10–0.16% O, and the total amount of Fe and Cr is within the interval 0.28–0.37%.

According to the invention, a good corrosion resistance and a small hydrogen pick-up are obtained for a fuel element with a cladding tube whose outer part consists of a zirconium alloy with addition of Sn within the content interval 0.65 to 0.95% and Fe within the interval 0.35 to 0.5%. The inner part of the cladding may consist of a conventional zirconium alloy such as zircaloy-4 and zircaloy-2 with a normal content of Sn (within the interval 1.2 to 1.7%), but may also consist of another zirconium alloy with sufficiently good mechanical and creep resistance properties to be able to constitute a supporting part of a fuel cladding. Of importance, however, is that during stress-relieve annealing of the inner part at 450 to 510° C., the cladding is given an only partially recrystallized outer part. When estimating the recrystallization temperature, all the alloying elements in the inner layer may be taken into consideration, which inner layer may comprise, in addition to Sn, Fe, Cr, Ni and Nb.

The Sn content in the outer part and the inner part shall be relatively equal and not differ more than at most 0.7% in order for a final heat treatment of the cladding at 450 to 510° C. to result in the supporting inner part being stress-relieve-annealed and the outer layer being only partially recrystallized. In this way, it may be ensured that hydrogen which is absorbed by the fuel cladding during operation will be precipitated evenly in the cross section of the cladding and preferably not in the boundary zone between the layers and, in addition, a largely tangential precipitation of the hydrides is obtained. Since the Fe content in the outer layer is relatively high and in partially recrystallization-annealed state, a harder outer layer is obtained, which facilitates the mounting of fuel rods in the fuel bundle.

During manufacture of a cladding tube for fuel rods included in a fuel element according to the invention, an inner tube of Zircaloy-4 is joined together with an outer part of zirconium with 0.8% Sn and 0.4% Fe. The inner part of zircaloy-4 is chosen so that the Sn content in the material does not exceed the Sn content in the outer layer by more than at most 0.7%. In both Zircaloy-4 and the outer layer, the other substances in the materials are limited to the maximally allowed values for reactor grade zirconium. The parts are joined together by means of extrusion so as to become metallurgically bonded, whereupon tube manufacture in conventional manner using cold-rolling operations and intermediate heat treatments is performed. The final heat treatment is performed at 450–510° C. for 2–5 hours.

Measurement of the hydride orientation shows that both the inner and outer parts are given an $f_n$-value <0.05. By $f_n$-value is meant the percentage of hydrides oriented within 45° from a radial direction in relation to the total number of hydrides.

During a normal hydride test, comprising intentional hydrogenation of the tube so that this contains at least 100 ppm hydrogen, few hydrides visible in a microscope are present in the outer layer or in the bonding zone between the layers. The outer layer constitutes approximately 10–25% of the wall thickness of the cladding tube.

During manufacture of the cladding tube, it is advantageous if the so-called annealing parameter A is high. An aim is that log A should be greater than −13. A is a measure of the sum of all the heat treatments during the tube manufacture and is defined as $A=\Sigma_i \, t_i \cdot \exp(-Q/RT_i)$, where $t_i$=annealing time in hours, $T_i$=annealing temperature in °K, Q=the activation energy=15000 J/mole, R is the general gas constant.

We claim:

1. A nuclear fuel element comprising fuel rods containing nuclear fuel enclosed in a cladding, whereby said cladding is built up of an inner supporting part of a zirconium alloy such as Zircaloy-2 or Zircaloy-4 and an outer layer constituting 10 to 25% of the thickness of the cladding wall and being bonded to the inner part, wherein the outer layer of the cladding is of zirconium with 0.65 to 0.95% Sn and 0.4 to 0.5% Fe as well as impurities in contents normal for reactor-grade zirconium; the difference in Sn content between the inner part of the cladding and the outer layer is at most 0.7%; and the cladding is finally heat-treated with the interval of 450 to 510° C.

2. A nuclear fuel element according to claim 1, wherein the cladding has a $f_n$-value for hydride-orientation which for both the outer layer and the inner part is less than 0.10 and no accumulation of hydrides in the outer layer or in the boding zone between the layers is obtained.

3. A nuclear fuel element according to claim 1, wherein the cladding is heat-treated during manufacture so that the annealing parameter A, log A>−13.

* * * * *